June 3, 1969  S. S. KERSHAW, JR  3,448,343
COMBINED OVERVOLTAGE PROTECTIVE DEVICE AND CONDUCTOR SUPPORT
Filed May 9, 1967
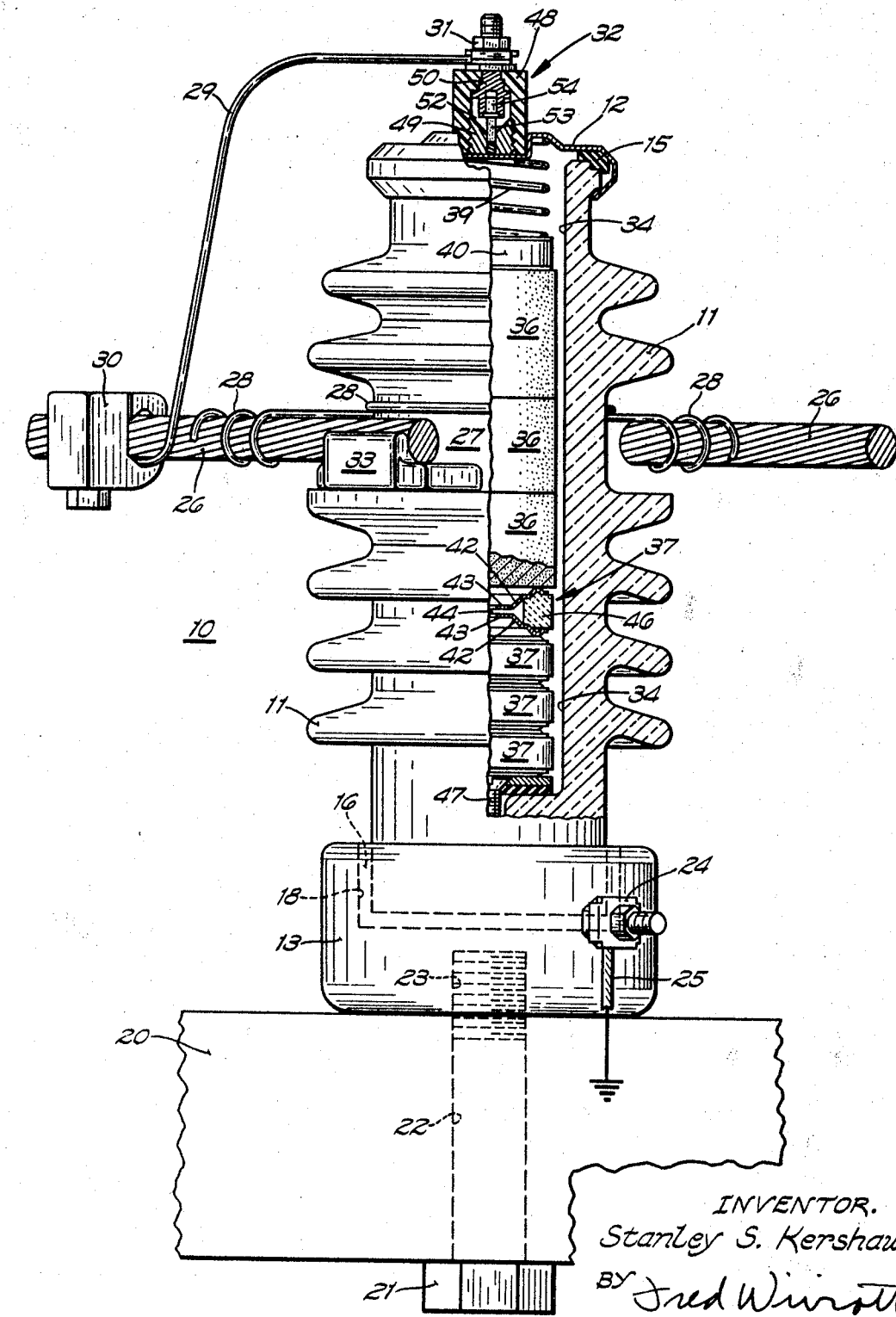
INVENTOR.
Stanley S. Kershaw, Jr.
BY Fred Wiriott
Attorney

United States Patent Office 3,448,343
Patented June 3, 1969

3,448,343
COMBINED OVERVOLTAGE PROTECTIVE DEVICE AND CONDUCTOR SUPPORT
Stanley S. Kershaw, Jr., Milwaukee, Wis., assignor to McGraw-Edison Company, Milwaukee, Wis., a corporation of Delaware
Filed May 9, 1967, Ser. No. 637,146
Int. Cl. H02h 1/00
U.S. Cl. 317—72                                    3 Claims

ABSTRACT OF THE DISCLOSURE

A hollow insulator for supporting a line conductor intermediate its ends and constructed and arranged to be mounted adjacent one end with its other end connected to the line conductor. Overvoltage protective means is disposed within the insulator for interrupting voltage surges, and means are provided at the other insulator end for interrupting the line conductor connection in the event the overvoltage protective device fails. The insulating level of the insulator being substantially equal between the line conductor and each of its ends.

Background of the invention

Prior art combination line support insulators and protective devices have generally included a hollow insulator having means at its upper end for supporting the line conductor and containing a protective device such as a spark gap assembly. In the event of a voltage surge, the spark gap assembly would break down to pass the surge current to ground. When such protective devices failed, however, they generally provided a permanent short circuit path to ground whereby the line wire would have to be open circuited by some back-up device, such as a fuse.

It is the object of the invention to provide a combination conductor support and overvoltage protective device wherein the insulating level of the conductor support is not diminished by failure of the protective device.

Brief description of the drawings

The single figure of the drawings is a side elevational view, with parts broken away, of the combined line support insulator and protective device according to the instant invention.

Summary of the invention

A combination protective device and conductor support comprising an insulating housing, having terminal means spaced from housing support means, and conductor support means spaced from the terminal means and the housing support means, and including conductor means connecting the line conductor to the terminal means, and means responsive to a predetermined condition of current flow through the protective device for disconnecting the line conductor from the terminal means.

Description of the preferred embodiment

Referring now to to the drawings, the combination lightning arrester and terminal support insulator 10 is shown to include a cylindrical housing 11 of a suitable insulating material, such as porcelain or glass, and which is closed at its upper end by a conductive cap 12 and at its lower end by a metallic conductive support base 13. The upper end of the housing 11 is sealed by means of a gasket 15 which is compressed between the upper end of the insulating housing 11 and the cap 12 while the lower end of the housing is also sealed by a gasket (not shown). In addition, the housing 11 is secured to the support base 13 by means of cement 16 which is disposed between the lower end of housing 11 and a cup-shaped recess 18 formed in said support base 13.

The assembly 10 may be mounted on a support member 20 in any suitable manner, such as by means of a bolt 21 which extends through an aperture 22 in the support member 20 and is threadably received within a tapped hole 23 formed in the support base 13. Those skilled in the art will appreciate that the assembly 10 may be supported horizontally as well as vertically. In addition, the support base may be provided with a terminal assembly 24 which is connected to ground by a conductor 25 and which may be suitably connected to the internal lightning arrester components, as will be described more fully hereinbelow.

A line conductor 26 is secured in a supported relation to the waist portion 27 formed intermediate the ends of the insulating housing 11 by means of a tie wire 28 which is suitably wrapped around the conductor 26 and said waist portion 27. In addition, a conductor 29 is electrically connected at one end to the line conductor 26 by a clamp 30 and at its other end to a terminal 31 carried at the upper end of the housing 11 by an interrupting device 32 whose function will be described in greater detail hereinbelow. If the housing 11 is mounted vertically, an integral arm 33 may be formed on the waist portion 27 of housing 11, for supporting the line conductor while the tie wire 28 is being secured.

The bore 34 of the housing 11 contains a stack of lightning arrester components which include valve block members 36 and spark gap assemblies 37 which are maintained in electrically conductive relation with each other by a compression spring 39 which may engage the upper end of the stack through a conductive spacer member 40.

The valve blocks 36 may have a generally cylindrical configuration and may be composed of a material, such as silicon carbide, which has a non-linear voltage characteristic whereby it presents a low resistance to surge currents and a high resistance to the normal power current of the system. The valve blocks 36 may be placed in a series circuit relation with one or more of the spark gap assemblies 37.

Each spark gap assembly 37 includes a pair of generally dished gap electrodes 42, each of which has an embossed central portion 43 disposed in an opposed relation to form a spark gap 44 and which are held in spaced relation by voltage equalizing resistor rings 46.

The lowermost spark gap assembly 37 is connected through a conductive stud 47 to the ground terminal 24 by means which is not shown but which is well known in the art.

The interrupting device 32 is of a type well known in the art and is provided for disconnecting the conductor 29 from the upper end of the insulating housing 11 in the event the lightning arrester components 36 or 37 should fail. More specifically, the interrupting device 32 includes an outer, generally hollow insulating housing 48 which has a lower electrode 49 in electrical engagement with the conductive cap 12 and an upper electrode 50 which is connected to terminal 31. The terminals 49 and 50 are disposed in spaced relation to form a spark gap 52 which may be shunted by a resistor 53. An explosive charge 54 is embedded in the upper electrode 50.

In operation, the spark gap assemblies 37 normally isolate the line conductor 26 from ground. Upon the occurrence of a voltage surge, however, the spark gap assemblies 37 break down and conduct surge current carried by the line conductor 26 to ground. Because of the non-linear resistance characteristic of the valve blocks 36, they readily pass the surge current and then restore the system to its normal operating condition after the voltage across the device has returned substantially to the line voltage of the system, by limiting the follow current to a value which is insufficient to sustain the arc across the gaps 37.

In addition to the arc struck across the gap assemblies 37, an arc will also be struck across the gap 52 between the lower and upper electrodes 49 and 50 of the interrupting device 32. When the lightning arrester components are operating normally this arc will be extinguished in a relatively short time. However, should the arrester components become damaged so that they cannot interrupt the system follow current, the arc across the gap 52 will be sustained. Such sustained arcing will heat the explosive 54, causing it to detonate. The resultant internal pressure rise will rupture the insulating housing 48 which, in turn, disconnects the conductor 29 from the internal lighting arrester components. In this manner the line of conductor 26 is disconnected from the upper end of the housing 11.

If the line conductor 26 were not disconnected from the upper end of the insulating housing 11 in this manner, a continuous short circuit path to ground may be provided through the damaged lightning arrester components. However, because the line wire 29 is disconnected from the conductive cap 12, the line conductor 26 will be isolated from ground. In addition, because the line conductor 26 engages the insulating housing 11 at its intermediate waist portion 27 and because the insulating level from said waist portion to each of the upper and lower ends of the housing 11 is substantially equal, the insulation level between line conductor 26 and ground will be substantially unaffected by the failure of the lighting arrester components.

In the event that arcing continues between the separated upper and lower terminals 49 and 50 after the interrpting device 32 has operated, the internal arcing within the housing 11 would cause a rapid pressure build-up to occur. When the pressure within the housing 11 reached a sufficiently high value, the upper cap 12 would be discharged from the upper end of the housing 11 to disengage the conductor 29 from the internal lightning arrester components.

According to another embodiment of the invention, the interrupter 32 may be omitted. In this event, separation of the terminal 31 from the internal lightning arrester components is accomplished by the action of the internal pressure which discharges the cap 12 from the housing 11. In this manner also, the insulation level between the line conductor 26 and ground will be substantially unaffected by failure of the internal lightning arrester components.

I claim:

1. A combination protective device and line conductor support comprising an insulating housing wherein said housing support means is disposed on one end of said housing and said terminal means disposed adjacent the other end thereof, and said conductor support means is disposed intermediate the ends of said housing wherein the insulation level between said conductor support means and each of the ends of said housing are substantially equal; said insulation housing comprising a lightning arrester means which includes nonlinear resistance means and spark gap means; said condition responsive means further including an explosive charge which is detonated in response to said current condition to separate said terminal from said housing at its uppermost side, whereby said combination protective device and line conductor support means functions as a grounded post type insulator as well as a lightning arrester which removes itself from the line when said lightning arrester means are non-functional while supporting said conductor.

2. The combination in claim 1 wherein said housing comprises an integral arm in the central portion of said housing for supporting the line conductor and receiving a tie wire whereby a secure bond of said conductor through the housing is accomplished.

3. The combination in claim 2 wherein the support base of said housing is grounded opposite a live terminal of the same.

References Cited

UNITED STATES PATENTS

| 2,392,342 | 1/1946 | Steinmayer | 317—72 X |
| 3,218,517 | 11/1965 | Sankey | 317—71 X |
| 3,249,815 | 5/1966 | Henry | 317—71 X |

JOHN F. COUCH, Primary Examiner.

J. D. TRAMMELL, Assistant Examiner.